United States Patent [19]

Napierkowski et al.

[11] Patent Number: 5,553,986
[45] Date of Patent: Sep. 10, 1996

[54] INDIRECT LOCK AND LOCK RELEASE MECHANISM

[75] Inventors: Susan M. Napierkowski; Arthur T. Nagare, both of Erie; Richard J. Verga, Cranesville, all of Pa.

[73] Assignee: American Sterilizer Company, Erie, Pa.

[21] Appl. No.: 326,378

[22] Filed: Oct. 20, 1994

Related U.S. Application Data

[60] Division of Ser. No. 964,451, Oct. 21, 1992, Pat. No. 5,387,063, which is a continuation-in-part of Ser. No. 868,911, Apr. 15, 1992, Pat. No. 5,431,521.

[51] Int. Cl.$^6$ ...................................................... B60P 1/64
[52] U.S. Cl. ............................ 414/401; 410/67; 410/66; 410/69; 414/584; 188/62; 188/63; 104/251
[58] Field of Search ................................ 188/33, 34, 35, 188/36, 38, 38.5, 41, 61, 62, 63; 104/249, 257, 251, 260, 254, 255, 100, 103, 257, 252; 49/70; 414/390, 395, 396, 400, 401, 331, 402, 584, 537, 538, 154; 432/239, 241, 250; 14/69.5, 71.1, 71.3, 71.5, 72.5; 422/219, 232, 286, 300, 301; 238/218; 410/30, 69, 66, 67

[56] References Cited

U.S. PATENT DOCUMENTS

| 745,069 | 11/1903 | McClure . | |
|---|---|---|---|
| 2,623,759 | 12/1952 | Forbas | 414/401 X |
| 3,021,795 | 2/1962 | Hayba et al. | 414/345 X |
| 3,261,650 | 7/1966 | Stromquist . | |
| 3,630,439 | 12/1971 | Cook | 414/401 X |
| 3,869,052 | 3/1975 | Leahy | 414/401 |
| 4,388,030 | 6/1983 | Skaale . | |
| 4,480,723 | 11/1984 | Ingvast et al. . | |
| 4,739,863 | 4/1988 | Stauffer . | |
| 5,004,387 | 4/1991 | Jensen et al. . | |
| 5,072,960 | 12/1991 | Sperko | 414/401 X |
| 5,224,812 | 7/1993 | Oslin et al. | 414/401 X |

FOREIGN PATENT DOCUMENTS

| 3830891 | 3/1990 | Germany . | |
|---|---|---|---|
| 751720 | 7/1980 | U.S.S.R. | 414/401 |

OTHER PUBLICATIONS

AMSCO—Small Steam Sterilization System, Mar. 1978, pp.1, 4–8.
AMSCO—Large Steam Sterilization System, Oct. 1977, pp. 1, 4, 6.
AMSCO—Eagle ETO Gas Sterilization System, Feb. 1983, pp. 1, 11.

Primary Examiner—Frank E. Werner
Attorney, Agent, or Firm—Jones, Day, Reavis & Pogue

[57] ABSTRACT

An indirect locking and lock release mechanism is provided that permits remote actuation of the lock release function and automatic reset of the locking function in a chamber. Linear actuation of a push rod from a transfer platform causes linear actuation of a linearly aligned push rod on the ramp which in turn causes pivotal movement of a blocking member from a locked to an unlocked position in the chamber. A detent device on the transfer platform sealed in an airtight workstation permits remote actuation of the locking components in the chamber from a worksuit provided in the workstation. The locking function is automatically reset without any intervention by the user of the workstation.

16 Claims, 13 Drawing Sheets

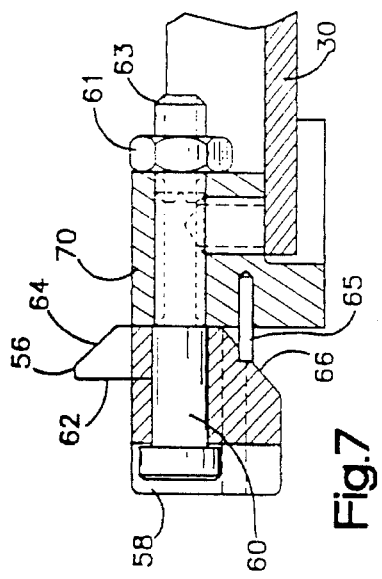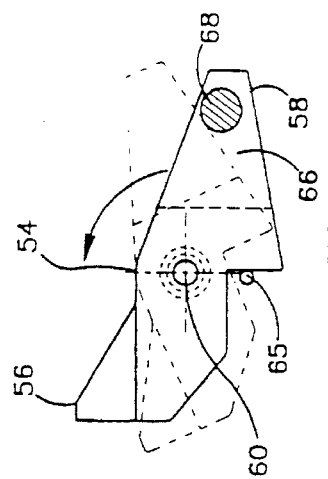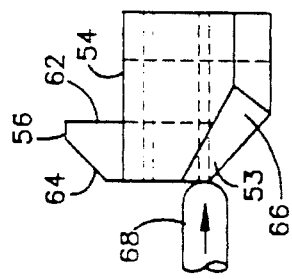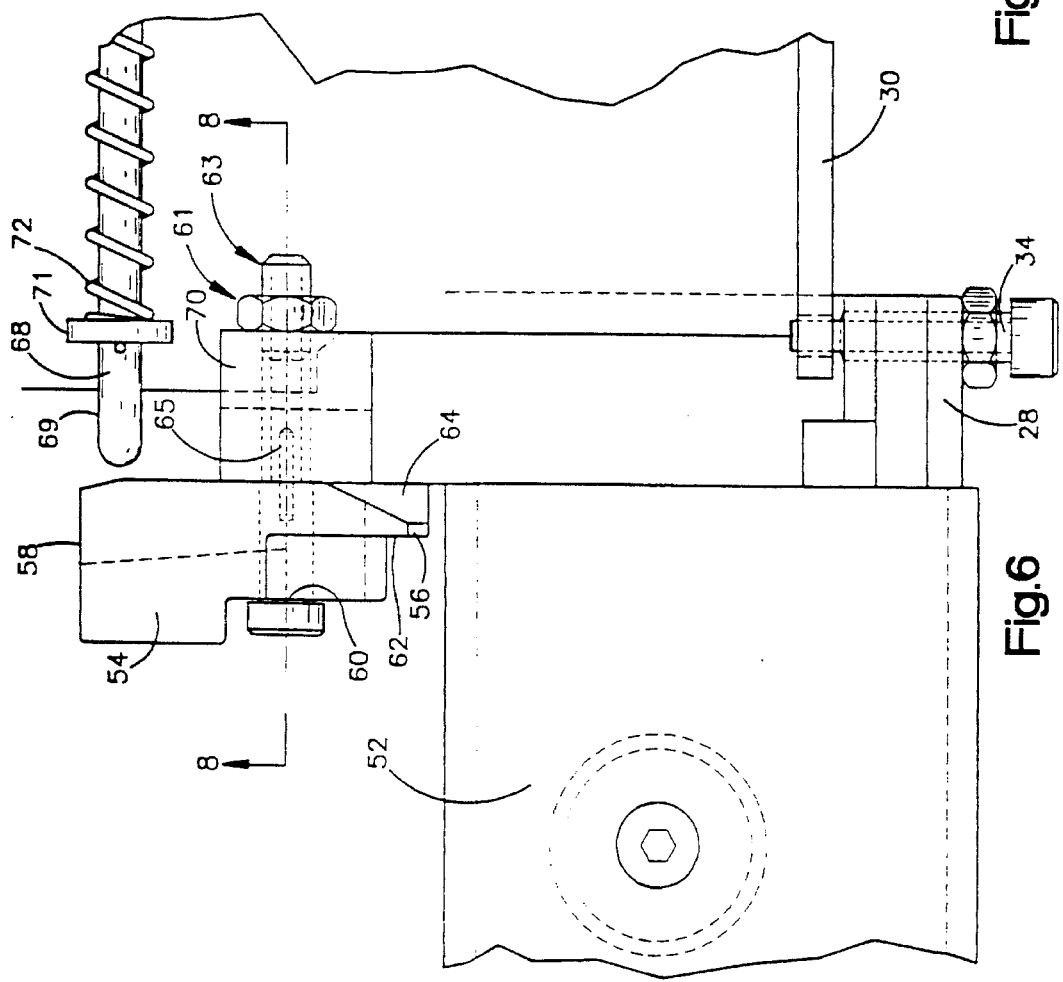

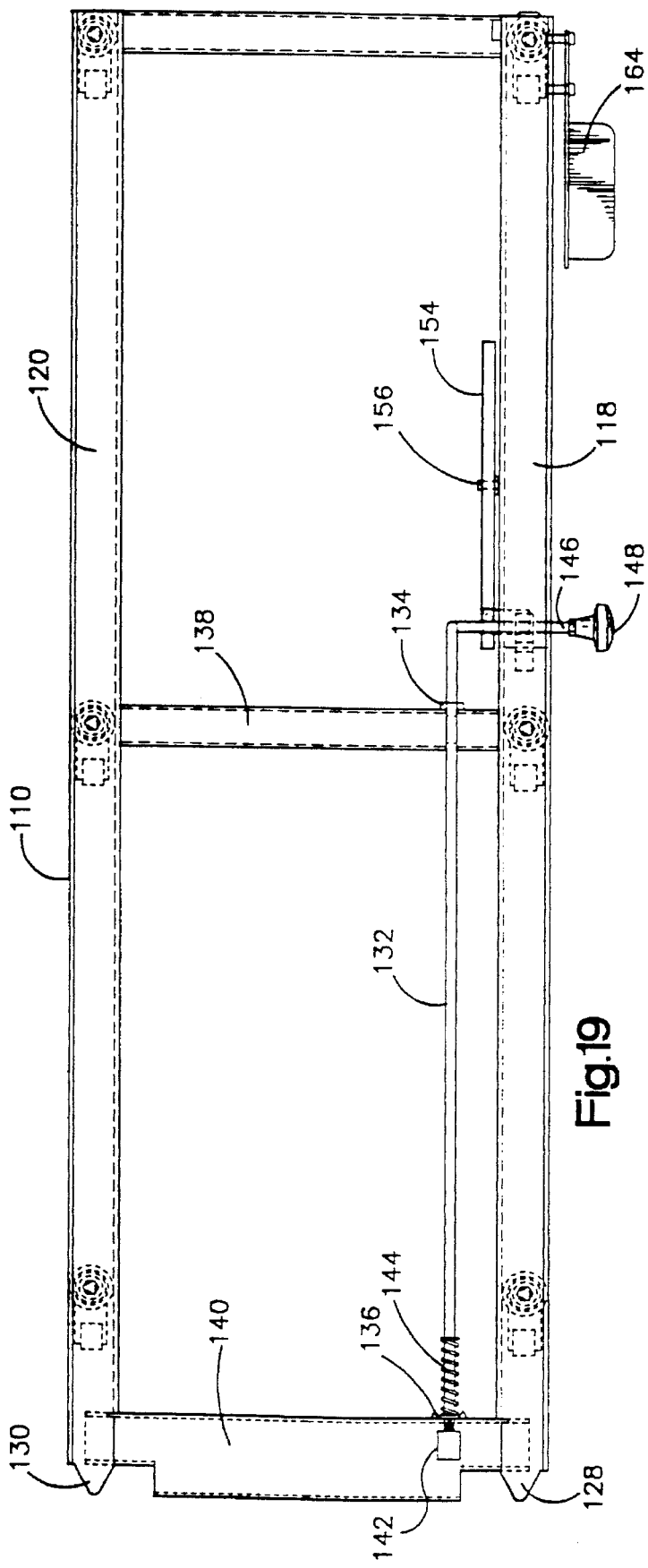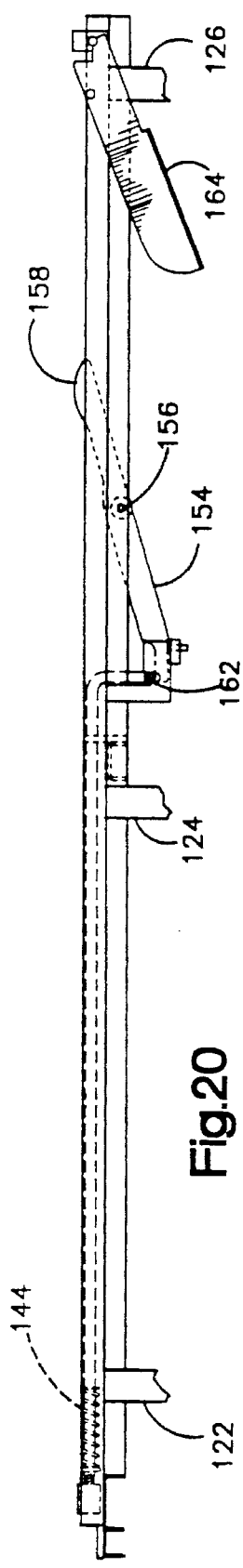
Fig.19
Fig.20

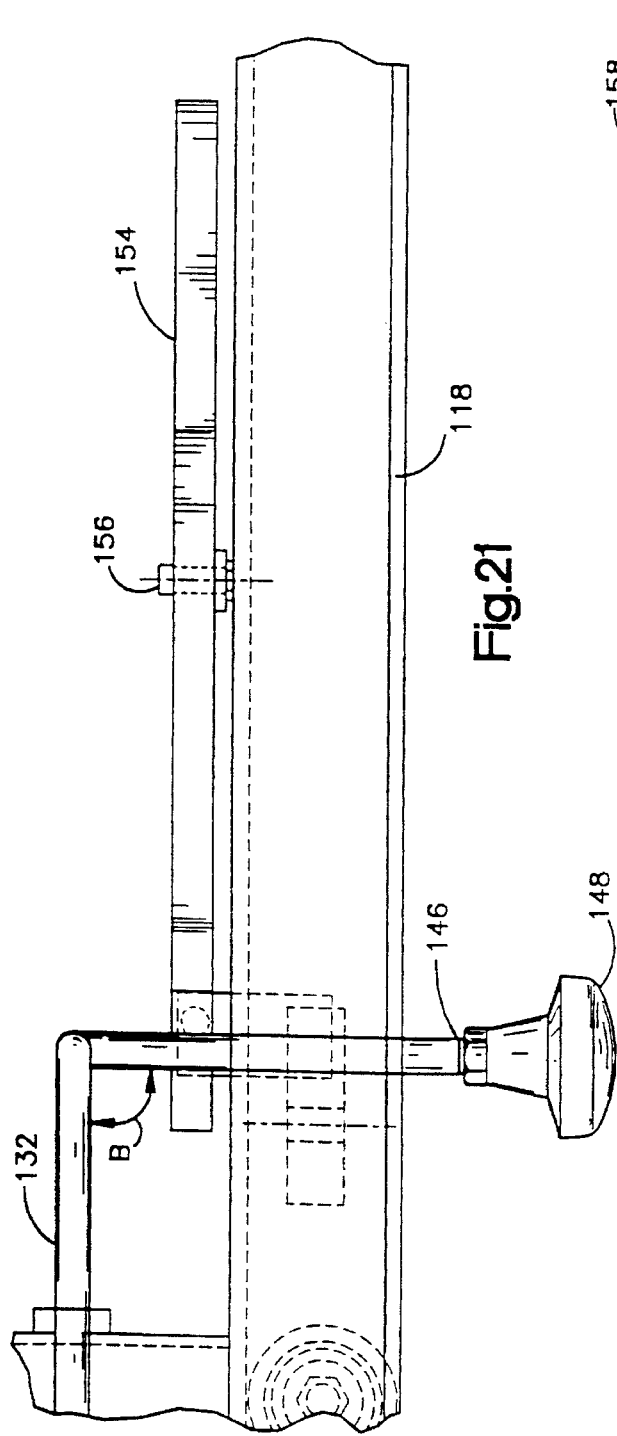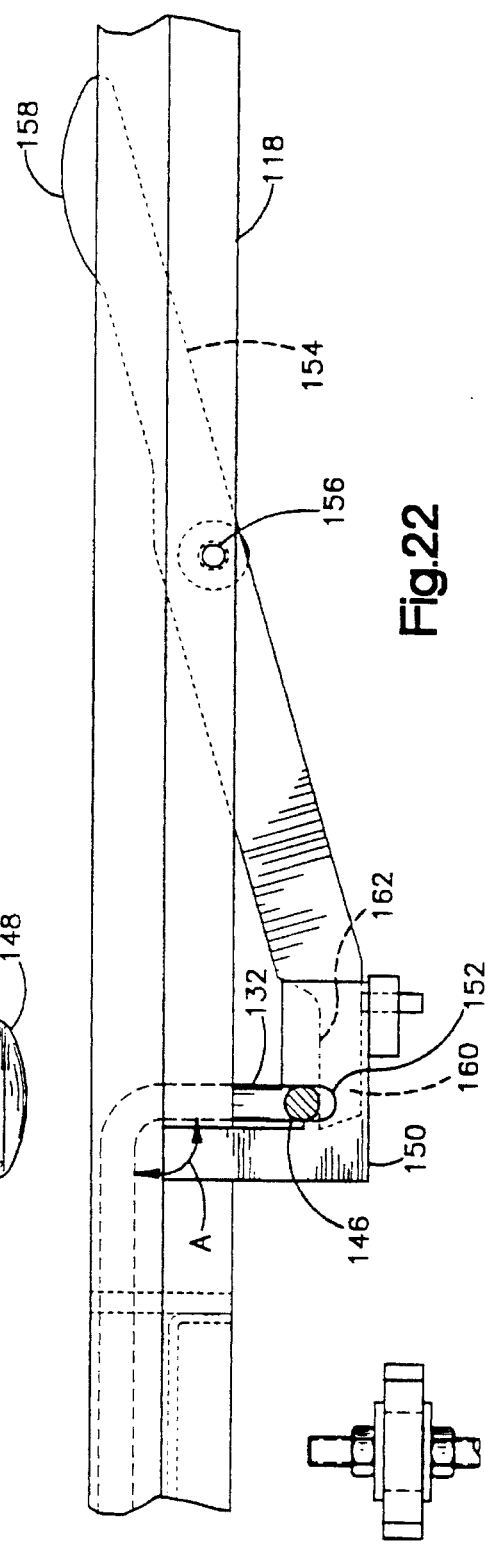

5,553,986

INDIRECT LOCK AND LOCK RELEASE MECHANISM

This is a divisional of application Ser. No. 07/964,451 filed on Oct. 21, 1992, now U.S. Pat. No. 5,387,063 which is a continuation-in-part of U.S. Ser. No. 07/868,911 filed Apr. 15, 1992, now U.S. Pat. No. 5,431,521.

BACKGROUND OF THE INVENTION

1. Field of Invention

The present invention relates to locking and unlocking mechanisms and more particularly, to apparatus for remotely releasing lock mechanisms.

2. Description of the Invention Background

In certain types of sterilizers and washers, a loading car carrying items to be sterilized or cleaned can be rolled directly into the chamber of the sterilizer/washer on tracks designed specifically to guide the loading car. Loading cars of this type are typically mounted on a transfer carriage which has wheels and can be pushed from place to place to bring the items to be sterilized or cleaned, including the loading car, to the sterilizer/washer and to return the loading car full of clean or sterilized items to a desired destination.

A loading car can also be unloaded from a sterilizer/washer on to a transfer platform contained in a sealed, airtight environment such as an isolator workstation. One of the walls or the floor of these sealed workstations usually has a worksuit that is formed into the upper torso of a human being, including work gloves. This configuration allows items on the transfer platform to be manipulated in the airtight environment. Examples of known isolator workstations that may contain a transfer carriage and have a worksuit are disclosed in Amsco publication Nos. SD-446 and SD-448, copies of which are filed concurrently herewith.

Often, however, it is difficult to safely transfer the loading car between the transfer carriage and the chamber of the sterilizer/washer. Many sterilizer/washers have a gap of from several inches to a foot between the chamber opening and the front panel of the sterilizer/washer. The transfer carriage cannot be pushed beyond the lower front panel. To permit the loading car to traverse the gap between the lower front panel and the chamber opening, conventional transfer carriages have extended track sections which meet the track within the sterilizer/washer chamber so that the loading car can roll along the track extensions into to rout of the chamber. The operator pushes the loading car into the chamber or pulls it out of the chamber over the extended tracks. The full weight of the loading car full of goods is borne by the extended tracks. There is a danger that the weight of the loading car will tip the extended tracks and the transfer carriage and thereby cause the transfer carriage to tip or roll back. The loading car can then crash to the ground.

Another problem is in the poor alignment that sometimes occurs between the extended tracks of the transfer carriage and the chamber tracks. If the tracks of the transfer carriage are not properly aligned with the tracks of the chamber, the loading car will not ride smoothly into the chamber, but will run into the side of the track or end frame of the chamber when the operator pushes the car forward. Often, the operator cannot see clearly whether the tracks are aligned when pushing the car from behind.

When unloading a loading car onto the transfer carriage, the operator must pull the loading car from the hot sterilizer/washer. Some systems do not have the loading cars locked into place. If these tracks are slightly tilted because the sterilizer is not level, the loading car can roll out of the chamber when the door is opened. If the loading car is somehow restrained in the chamber, the operator must reach into the hot chamber to release the loading car before removing it from the sterilizer/washer, then pull the car out over the track extensions onto the transfer carriage. Furthermore, the transfer carriage itself is on wheels and thus, can roll away from the sterilizer/washer while the operator is pulling or pushing the loading car.

When unloading a car from the sterilizer/washer onto a transfer platform contained in a workstation, the operator is prevented by the walls and the worksuit of the workstation from reaching into the sterilizer/washer. Therefore, it is very difficult for an operator in the workstation to reach into the chamber to unlock the loading car and then reset the locking mechanism. Furthermore, the opening of the sterilizer/washer is very hot after a sterilization cycle, and this heat would damage the working gloves of the worksuit if the operator had to contact the sterilizer/washer opening to release a loading car.

There is a need for a mechanism to secure the transfer carriage in position relative to the sterilizer/washer for safe transfer of the loading car into and out of the chamber. There is a further need to lock the loading car into the chamber and to remotely unlock the loading car to eliminate the need for operators to reach into hot sterilizer/washers to release the car. There is a further need to unlock the loading car in the chamber and reset the locking mechanism remotely from an isolator workstation. Finally, there is a need for a fail safe mechanism to prevent release of the loading car until the transfer carriage is securely positioned relative to the sterilizer/washer.

SUMMARY OF THE INVENTION

The object of the present invention is to provide a safe and easy to use mechanism for loading and unloading cars from the chamber of a sterilizer/washer. Other uses for the lock and unlock mechanism of the present invention will become apparent to those skilled in the art as they read the following description of the invention.

The present invention provides an apparatus for remotely permitting or prohibiting the travel of a movable device, such as a loading car. The apparatus includes a blocking member mounted for movement between a first position for blocking a path of travel of the movable device and a second nonblocking position for permitting the travel of the movable device when it is on the path, an actuating member having a first end proximate the blocking member and a second end remotely situated from the blocking member, means to bias the actuating member away from operative contact with the blocking member, and means remotely situated from the blocking member for cooperating with the second end of the actuating member for moving the first end of the actuating member into operative contact with the blocking member effective for moving the blocking member from the first position to the second position or from the second position to the first position as desired.

The apparatus also includes means for locking the actuating member into operating contact with the blocking member to maintain the blocking member in the desired position. Means for releasing the locking means to permit the actuating member to move out of operative contact with the blocking member are also provided.

The cooperating means is preferably mounted on a movable carrier, such as a transfer carriage, and the blocking member is mounted on a stationary surface, such as the floor of a chamber or other compartment. The actuating member is intermediate the blocking member and the cooperating means so that operation of the remotely situated cooperating means causes the actuating member to move the blocking member to the desired position. The apparatus of the present invention also preferably includes means for securing the movable carrier to the stationary surface, and means for preventing the cooperating means from cooperating with the actuating member unless the movable carrier is secured to the stationary surface. Means for releasing the securing means may also be provided.

The blocking member of the present invention can be unlocked by an operator standing behind the movable carrier without having to touch any hot parts. The blocking member will automatically stay in the second, unlocked position, once the cooperating means actuates the actuating member. An automatic reset is provided to return the cooperating means and the actuating member to their unactuated positions when the securing means for securing the movable carrier to the stationary surface are released.

The invention also includes detent means for holding said actuating member in contact with the blocking member and for automatically releasing said actuating member when the movable carrier is unloaded from the sterlizer/washer. This detent means may be contained in a sealed chamber such as an isolator workstation. Thus, an operator in an isolator workstation may remotely unlock the blocking member of the present invention and it will be automatically reset without having to reach into the chamber.

BRIEF DESCRIPTION OF THE DRAWINGS

The present invention can be better understood by reference to the drawings, which are illustrative only, of the preferred embodiment of the invention.

FIG. 6 is an enlarged top view of the track lock mechanism.

FIG. 7 is a side section view of the track lock through the line VII—VII of FIGS. 2 and 6.

FIG. 8 is a front view of the track lock, showing its rotational movement.

FIG. 9 is a side elevation view of the track lock.

FIG. 19 is a top view of a transfer platform with a release and automatic reset mechanism.

FIG. 20 is a side view of the transfer platform of FIG. 19.

FIG. 21 is a top view of the release and automatic reset mechanism of FIG. 19.

FIG. 22 is a side view of the release and automatic reset mechanism of FIG. 19 with the push rod in the unlock position.

DETAILED DESCRIPTION OF THE PREFERRED EMBODIMENTS

Figure 1:
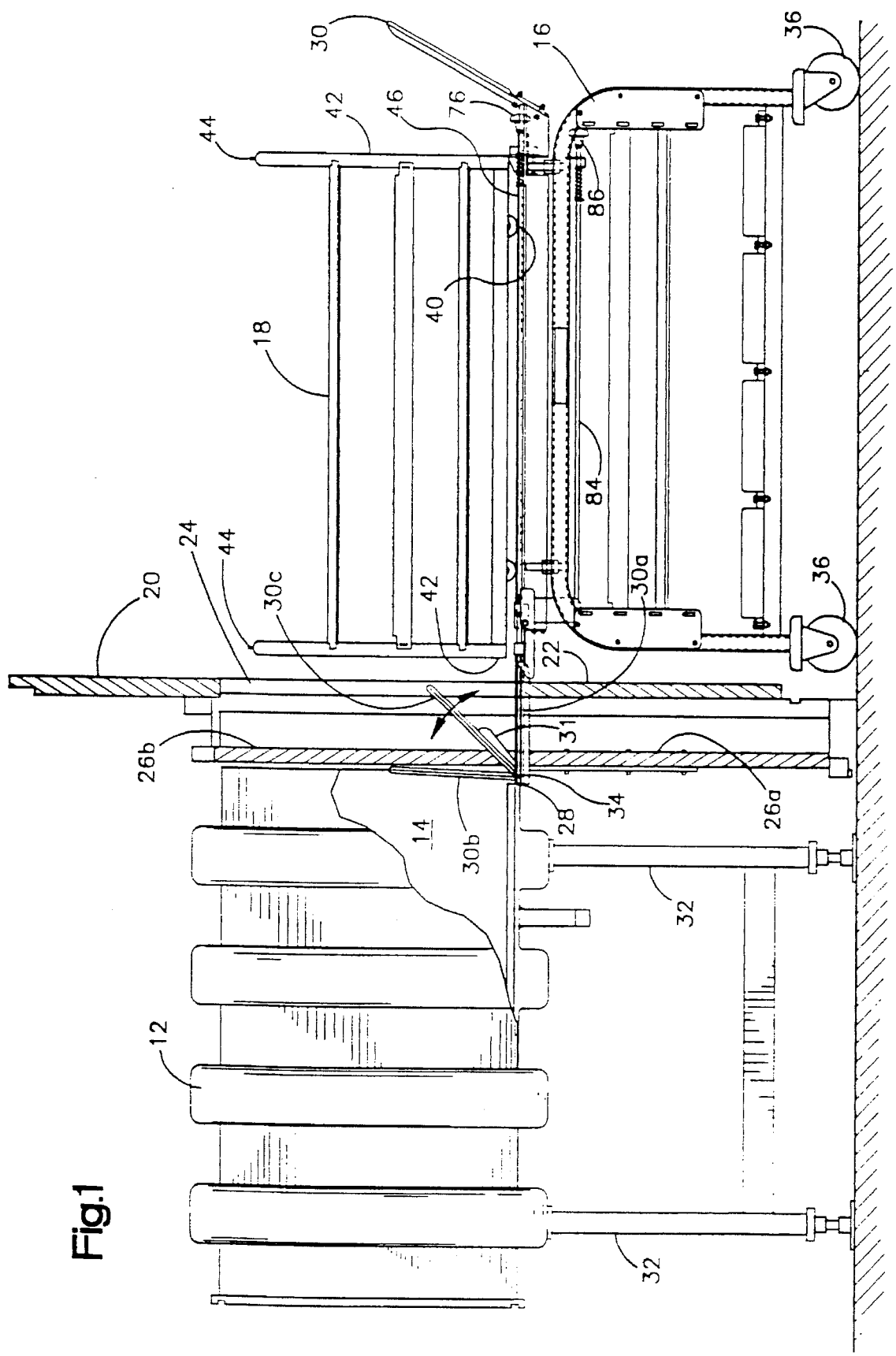
FIG. 1 illustrates a side, partially cut away view of a chamber, movable transfer carriage and loading car.

FIGS. 1–23 illustrate various component parts of the indirect lock and lock release mechanism of the present invention. FIG. 1 shows generally a chamber housing 12 defining a chamber 14, a transfer carriage 16 and a loading car 18. The chamber housing 12 can be a sterilizer, a washer or any compartment wherein a car or other movable device can be temporarily housed, preferably in a locked position on a track, guide system or the like. Those skilled in the art will recognize that the lock and lock release mechanism of the present inventor has a variety of applications in the health care, food service, transportation and other industries. The mechanism of the present invention was specifically designed for use with front loading sterilizers having vertically sliding doors and will be described in detail herein with reference to that preferred application.

Figure 2:
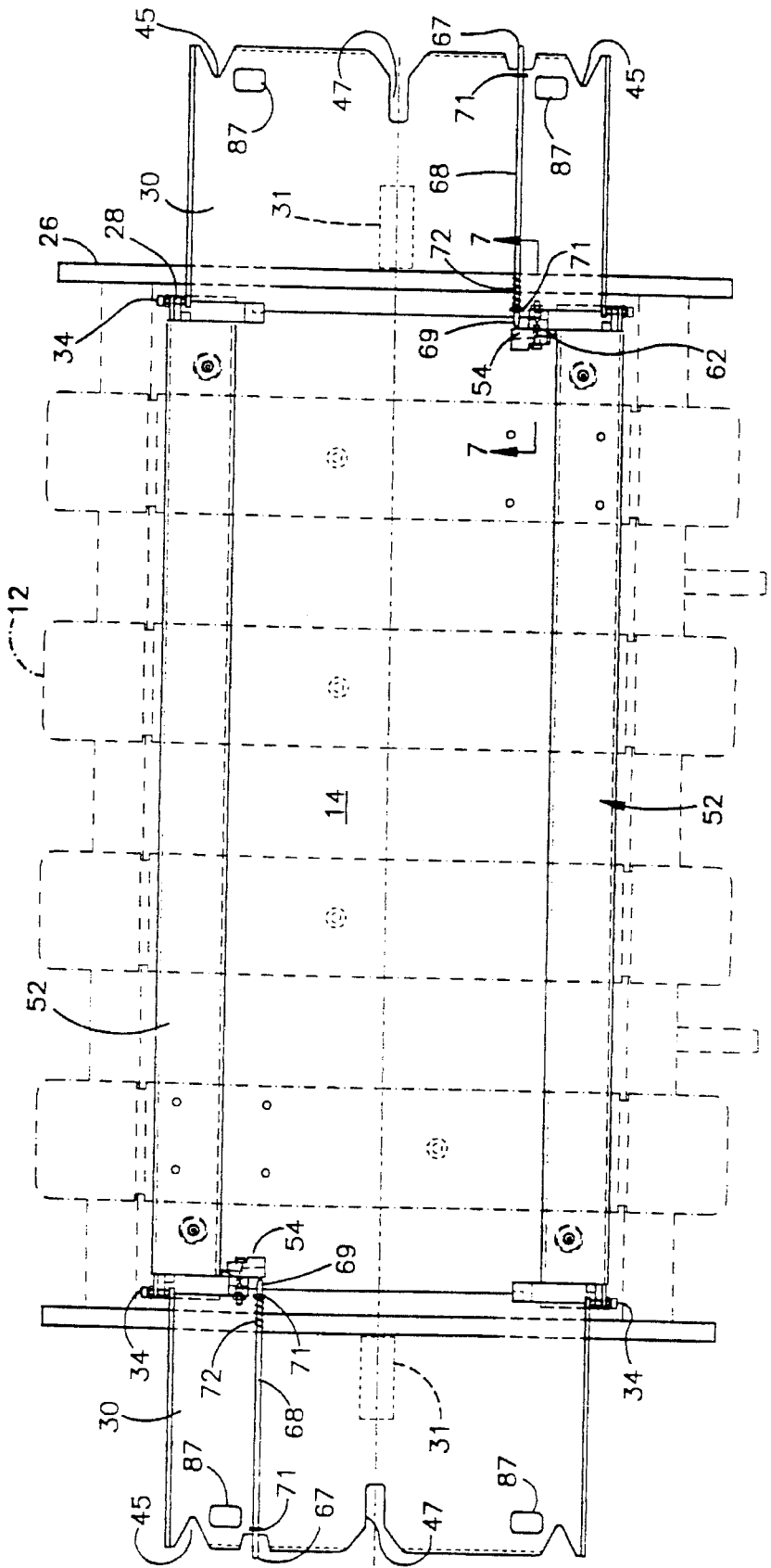
FIG. 2 illustrates a top plan view of the interior floor of a chamber which is accessible to both ends and which shows the track lock mechanism.
Figure 3:
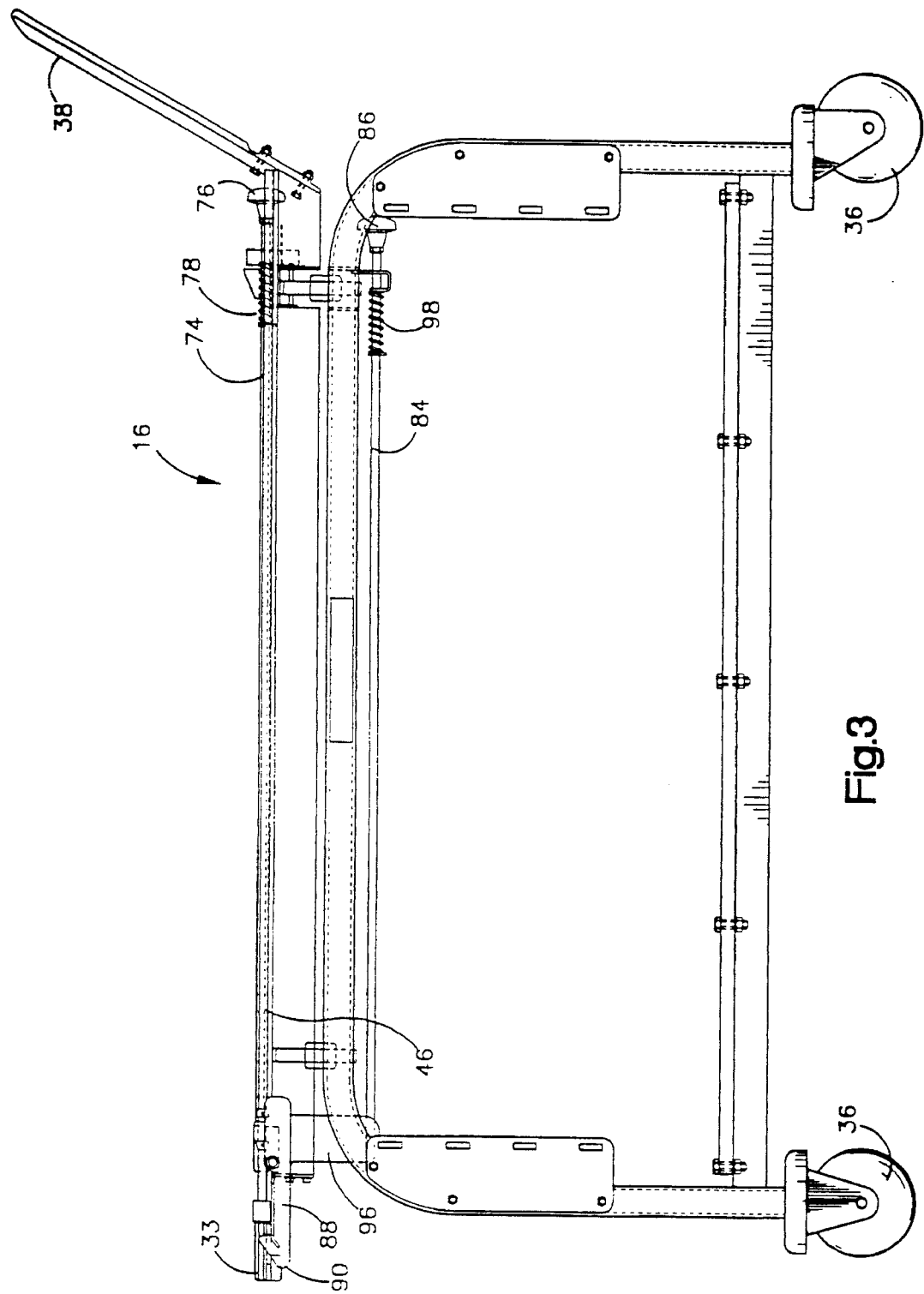
FIG. 3 is a side view of a transfer carriage showing a portion of the remote track lock release mechanism.

The chamber housing 12 is positioned on legs 32 behind a front panel or wall having an upper panel 20 and a lower panel 22. FIG. 1 illustrates door 26 in both the open (26a) and the closed (26b) positions. The chamber door 26 slides vertically to open and close the opening of the chamber. The floor of the chamber 14 provides a stationary surface on which the loading car 18 is kept during processing. Referring to FIG. 2, the floor of chamber 14 includes a pair of tracks 52 for guiding the wheels 40 of the loading car 18 as it travels in and out of the chamber. A block at the end of the chamber tracks 52 is designated as 28 in FIG. 1.

As shown in FIG. 1, there is a gap between the opening 24 in the front panel and the track end 28 on the floor of the chamber 14. To bridge the gap, a ramp 30 is shown in three of its positions, fully raised (30b), fully lowered (30a) and in between (30c). The ramp 30 preferably moves from the fully raised position to the fully lowered position and vice versa with the opening and closing, respectively, of the door 26. Ramp 30 is pivotally mounted by a pivot pin 34 to the track end block 28 in the chamber 14. The ramp fully raised position is adjusted by means of a screw 63 and nut 61. Ramp 30 has two notches 87 spaced a distance d from each other, v-shaped recesses 45 and a guide slot 47. Ramp 30 and its operation are described more fully in the co-pending United States patent application of Susan M. Napierkowski and Arthur T. Nagare for Sterilizer Loading Car Transfer Apparatus, filed simultaneously herewith, the relevant details of which are incorporated herein by reference. While the ramp 30 is used in the preferred embodiment, any suitable bridge between the transfer carriage 16 and the chamber 14 that can be used to support the loading car 18 during transfer and which can be secured to the transfer carriage 16 will suffice. In other applications where there is no gap between the opening of the compartment and the movable carrier, a bridge or ramp between the two will not be necessary. The movable carrier can be secured directly to the stationary surface of the compartment.

Figure 4:
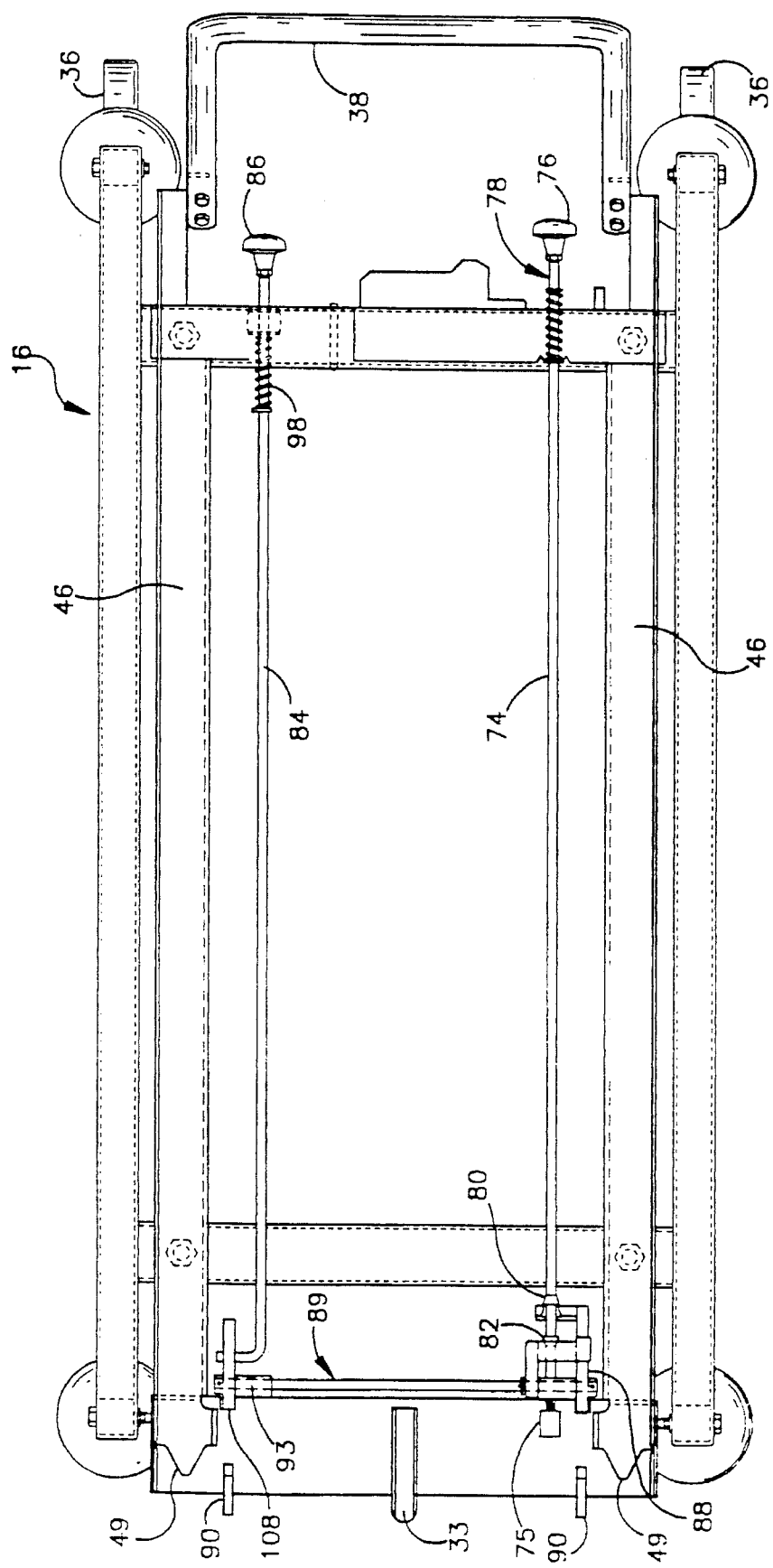
FIG. 4 is a top view of the transfer carriage of FIG. 3.

The transfer carriage 16 is an example of a movable carrier for transporting movable devices such as the loading car 18. Suitable known means are provided to lock the loading car 18 to the transfer carriage 16 during transport until the loading car is to be rolled into the chamber 14. The transfer carriage 16 includes an alignment bar 33 having a rounded end to be received in the guide slot 47 of ramp 30, wheels 36, suitable shelving, a pair of tracks 46 with V-shaped tips 49 and a push handle 38. Referring to FIG. 4, the transfer carriage 16 also includes a track lock release push rod 74 and knob 76 and a latch hook release rod 84 and knob 86, springs 78 and 98 are provided on each rod 74, 84, respectively. Two latch hook members 88, 108 are pivotally mounted on opposing sides of the transfer carrier 16 and spaced a distance d from each other for engagement with complementary notches 87 in ramp 30. A cross rod 89 connects the hook members 88, 108 so that they can be moved in unison.

The loading car 18 includes two opposing ends 42, shelving for holding items to be sterilized or cleaned and wheels 40 which ride within the tracks 46 of the transfer carriage 16. The wheels preferably include ball bearings to make the loading car 18 easy to manipulate. The easier manipulation of the car 18 can create problems if the chamber surface is not entirely level. The car 18 can roll out when the door 26 is opened (26*a*). To prevent the unintended travel of the car 18, the lock mechanism of the present invention is required. As shown more clearly in FIG. 5, the ends 42 of loading car 18 include squared bottom edges 48 for locking cooperating with the track lock of the present invention, as described more fully below. The top edge of each end 42 of the loading car 18 includes a sight 44, similar to a gun sight, to aid alignment of the transfer carriage 16 by lining the sights 44 with a corresponding triangular shaped marker (not shown) on the center edge of the front panel 20.

The track lock mechanism of the present invention is shown more fully in FIG. 6–9. The track lock mechanism includes a specially shaped blocking member 54 pivotally mounted to a mounting member 70 by shoulder bolt 60. Referring to FIG. 8, the blocking member 54 includes an upwardly extending stop portion 56 and a downwardly extending weighted portion 58.

Figure 5:
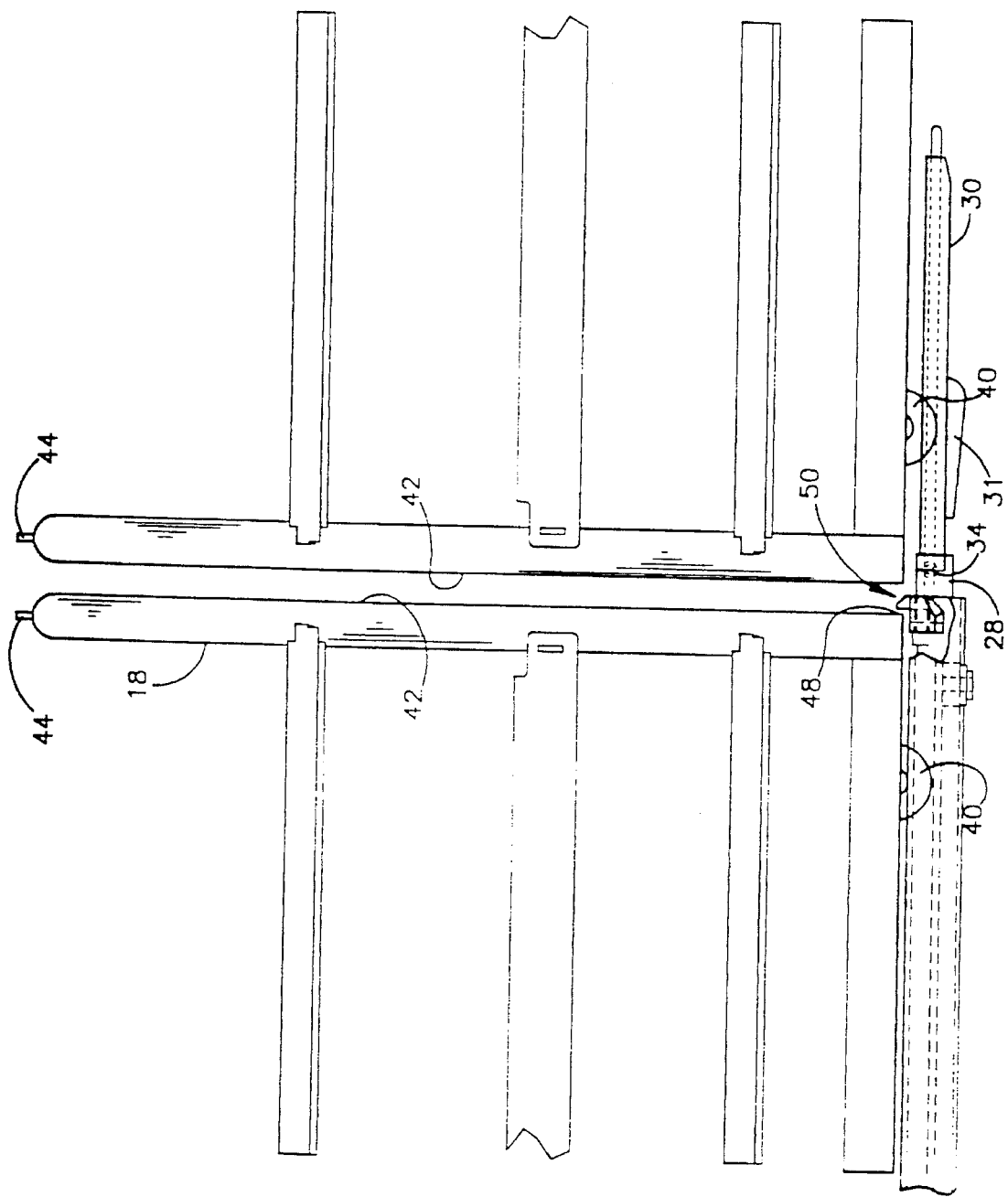
FIG. 5 illustrates a loading car in an inside and an outside position relative to the chamber of FIGS. 1 and 2, including the track lock mechanism.

The stop portion 56 has a flat face 62 against which the complementary flat face of squared edge 48 of the loading car 18 will stop, as shown in FIG. 5, to prevent the car 18 from rolling out of chamber 14. Stoop portion 56 also includes an inclined face 64. The flat face 62 faces the interior of the chamber and the inclined face 64 faces the adjacent chamber opening. When a car 18 is pushed into the chamber 14, the leading edge 48 of the front end 42 slides along the inclined face 64 of stop portion 56 of blocking member 54 forcing stop portion 56 to pivot downwardly in a counter clockwise direction about pivot pin 60. Car 18 is thereby able to be rolled into the chamber 14 without manipulation of the track lock mechanism by the operator. Car 18 passes the blocking member 54 as it moves in, holding stop portion 56 down as it progresses until car 18 is entirely within the chamber 14. After car 18 passes blocking member 54, the weighted portion 58 falls by gravity and causes blocking member 54 to pivot in the opposite direction, permitting stop portion 56 to move upwardly again so that the flat face 62 is poised to abut the complementary flat face of squared edge 48, thereby prohibiting the travel of the car 18 out of chamber 14.

A roll pin 65 provides a stop to prevent weighted portion 58 from pivoting too far in the clockwise direction and thus keeps stop portion 56 in the preferred elevated or blocking position.

To unlock the loading car 18 and permit it to travel out of the chamber 14, an actuation member in the form of ramp push rod 68 is moved into operative contact with the weighted portion 58 of the blocking member 54. In embodiments not having a ramp or bridge between the movable carrier and the stationary surface of the compartment, the actuation member can be mounted to the movable carrier or to the stationary surface. In the preferred embodiment wherein a ramp or bridge is used, the actuation member is preferably mounted on the ramp or the bridge.

Weighted portion 58 of the blocking member 54 includes an undercut inclined face 66 which is configured to interact with one end of the push rod 68. Push rod 68 has two opposing rounded ends 67,69 and a spring 72 near end 69. Spring 72 biases ramp push rod 68 away from the inclined face 66 of weighted portion 58 and out of operative contact with blocking member 54. Push rod 68 is held in alignment on ramp 30 by guide brackets 71. Push rod 68 can slide back and forth in the direction of its longitudinal axis through guide brackets 71.

Figure 16:
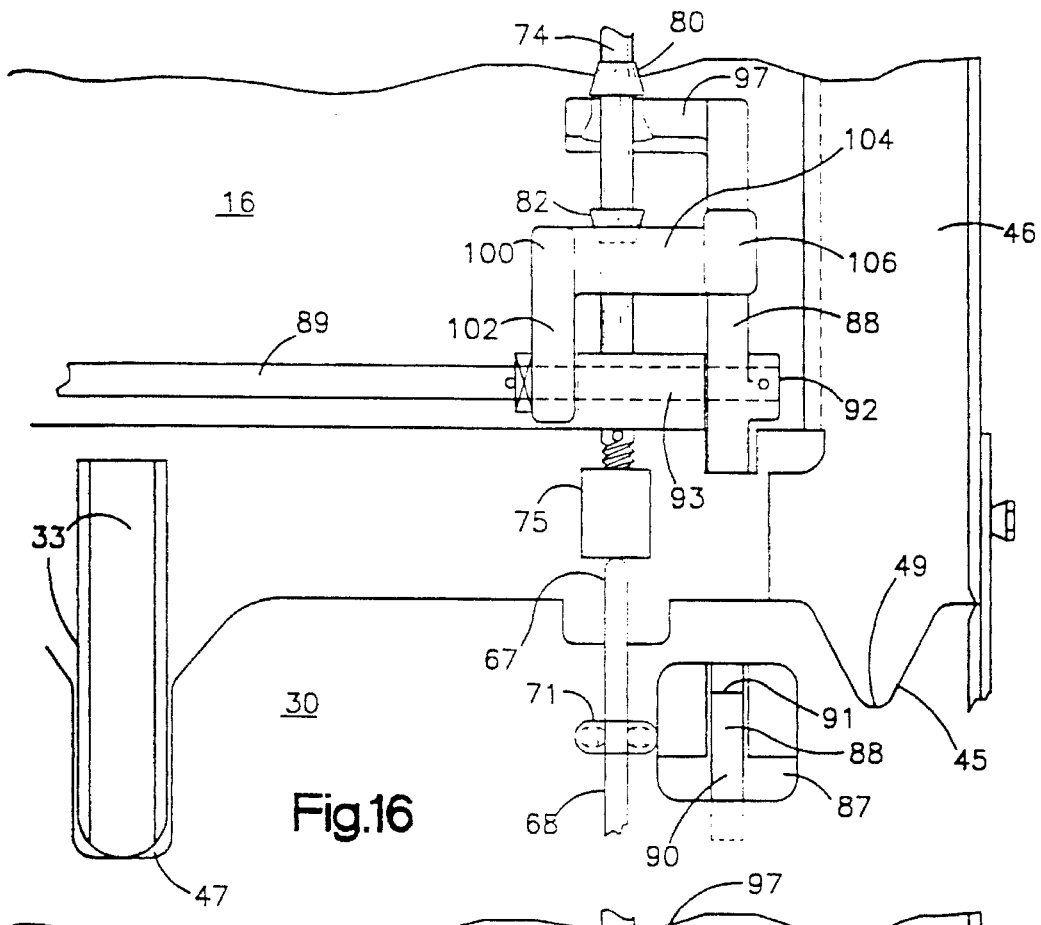
FIG. 16 is a top view of the fail safe mechanism in the unlocked position.
Figure 17:
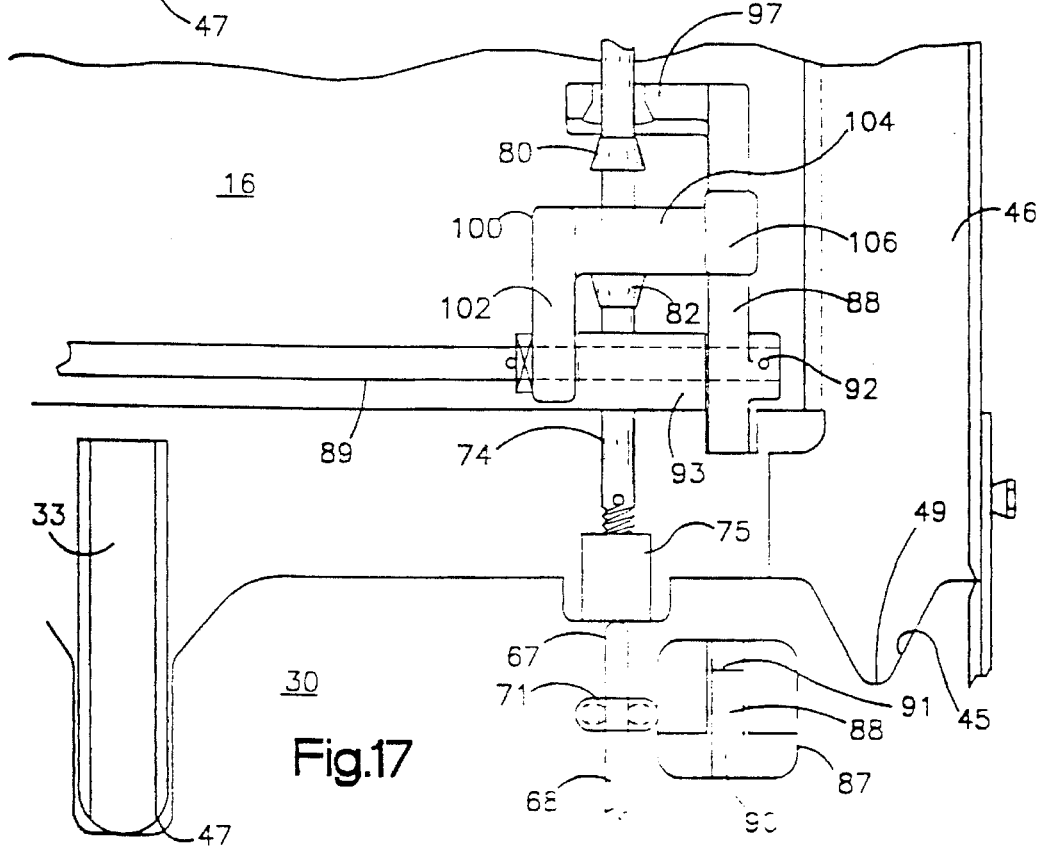
FIG. 17 is a top view of the fail safe mechanism in the locked position.

The track lock mechanism can be remotely unlocked by the release mechanism which cooperates with the actuation member to move the blocking member 54. The actuation member and the release mechanism may be integrally connected, e.g. may form a unitary device or, as in the preferred embodiment described herein, may be two distinct devices. FIG. 4 illustrates a carriage push rod 74 having a knob 76 and a spring 78 at the remote end of the transfer carriage 16 near handle 38. At the opposite end of the carriage push rod 74, as shown in FIGS. 16 and 17, is a blunt faced adjustable rod tip 75 which is threaded onto the end of carriage push rod 74. Conical stop members 80, 82 are fixed along the length of push rod 74. Each conical stop member has a flat surface and an inclined surface, as shown in the Figures.

Latch hook members 88, 108 are used to secure the transfer carriage 16 to ramp 30. Each of the two latch hook members 88, 108 are pivotally mounted on cross rod 89 on the sides of the transfer carriage 16. A pivot pin 92 holds the latch hook members 88, 108 to the cross rod 89. Each latch hook member 88, 108 includes a generally horizontally disposed arm 94. Latch hook member 108 is shaped generally like a pistol and also includes a generally vertically disposed leg 96 extending from the arm 94. Cross rod 89 and thus, the pivot point of the members 88, 108 is positioned at about the mid length of the arm 94 dividing arm 94 into forward and rearward sections. The leg 96 extends downwardly from the rearward section of the arm 92 on latch hook member 108. One latch hook member 108 is positioned on each side of the transfer carriage 16 as shown in FIG. 4. The cross rod 89 interconnects the opposing latch hook members 88, 108. At the forward, leading section of each arm 94 is a hook portion 90 which is configured to engage the complementary notches 87 of the ramp 30 to secure the position of the transfer carriage 16 relative to the floor of chamber 14. Each hook portion 90 has a generally smooth outer contour and a blunt inner contour including flat inside edge 91. On the latch hook member 88, there is a bracket 97 at the rearward, trailing section of the arm 94. The lateral bracket 97 has a recess in which push rod 74 can sit when the bracket is elevated by pivotal movement of the rearward section of arm 94. Bracket 97 may be integrally attached to the latch hook member 88 or it may be a separate piece fixed thereto.

A latch release bar 100 is also provided. It is preferably a generally L-shaped member having a leg 104 and an arm 102 pivotally mounted on cross rod 89 at one end of a block 93. The leg 104 extends at a right angle from the arm 102, passes over push rod 74 and rests at end 106 on the arm 94 of the latch hook member 88 to the rear of the cross rod 89. Latch hook release rod 84 is directly joined to the leg 96 of latch hook member 108 and indirectly joined to the other latch hook member 88 through cross rod 89. By pulling latch release rod 84, the leg 96 is pulled rearward toward the rear end of the transfer carriage 16. The rearward movement is translated through cross rod 89 to latch hook member 88 causing both latch hook members 88 and 108 to pivot in unison.

In operation, when a loading car 18 is to be loaded into the chamber 14, the door 22 of the chamber is lowered (22a) to expose the chamber opening and to lower ramp 30 to the fully lowered position (30a). A ramp slide 31 on the underside of ramp 30 mates with a ramped shaped door cover for proper contact and door movement. Through the free floating pivot arrangement of the ramp 30 as described in the previously referenced co-pending United States patent application of Susan M. Napierkowski and Arthur T. Nagare for Sterilizing Loading Car Transfer Apparatus, the weight of the loading car 18 as it rolls over the ramp 30 is transferred to the chamber tracks and is not borne by the relatively small pivot pin 33.

Figure 10:
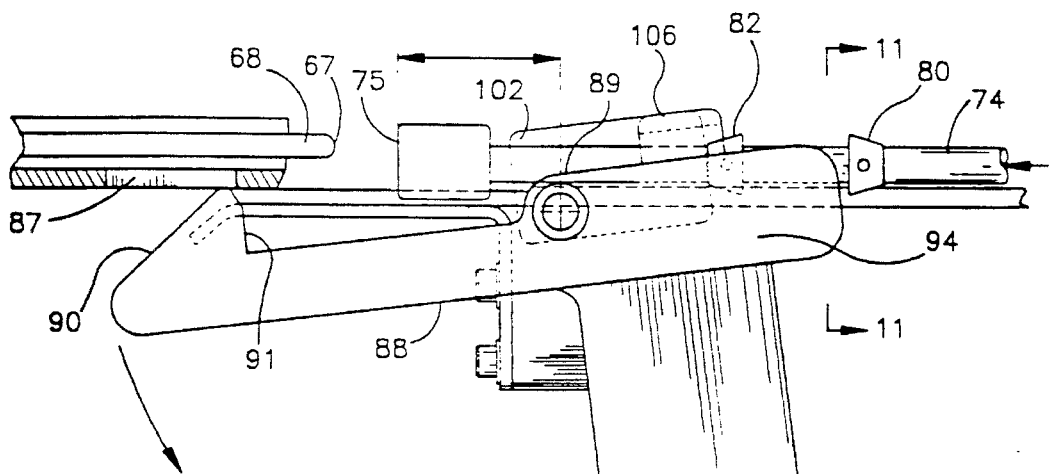
FIG. 10 is a side view of the carriage latch hook in an unlocked position and the fail safe mechanism for preventing release of the track lock.
Figure 11:
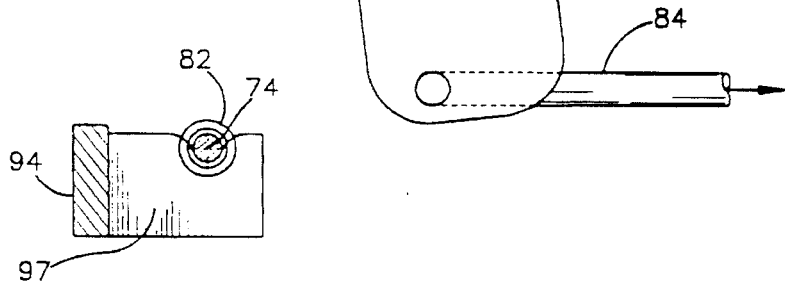
FIG. 11 is a section view showing a portion of the fail safe mechanism through line XI—XI of FIG. 10.
Figure 12:
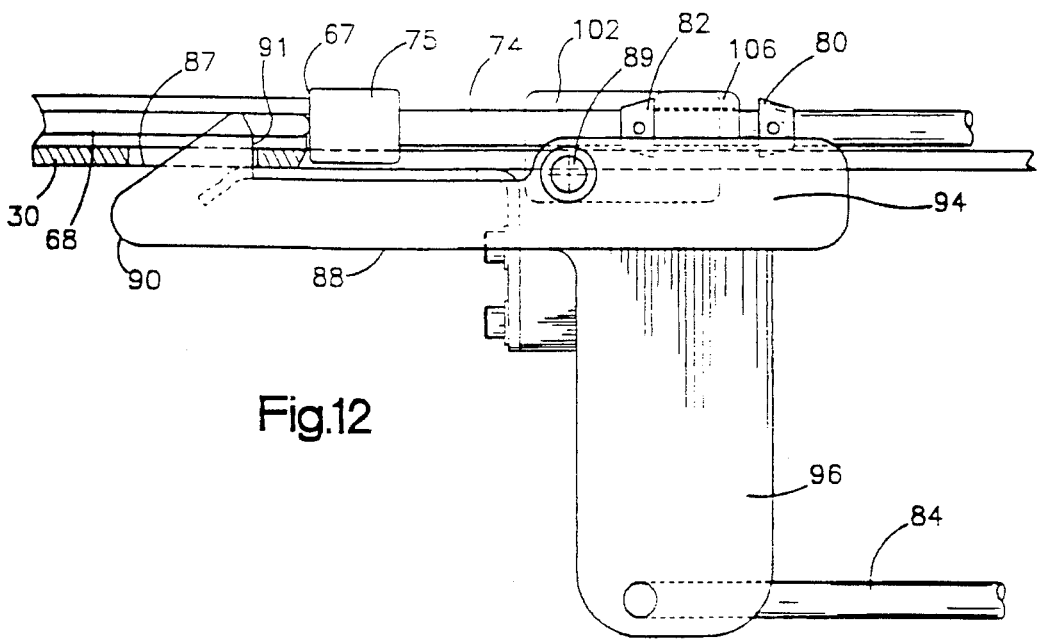
FIG. 12 is a side view of the carriage latch hook of FIG. 11 and the carriage push rod in a locked position.

The transfer carriage 16 with the loading car 18 mounted on it is pushed toward the ramp 30. Sights 44 and the marker can be used to align the loading car 18 with the opening 24. As the transfer carriage 16 is pushed toward the ramp 30, the edge of the ramp 30 slides up the inclined end of hook portions 90 of the latch hook members 88, 108 until the hook portions 90 reach notches 87 in the ramp 30, as shown in FIG. 10. Then the ramp falls, allowing the hook portions 90 to engage the notches 87, as shown in FIG. 12. The flat inside edges 91 of the hook portions 90 abut the edge of notches 87 to prevent the transfer carriage 16 from being pulled back away from ramp 30 so that the transfer carriage 16 is securely positioned relative to the chamber 14. Alignment bar 33 slides into guide slot 47 of ramp 30 and the V-shaped ends 49 of tracks 46 align with the complementary V-shaped recesses 45 in ramp 30 to ensure alignment of the tracks 46 on transfer carriage 16 with the ramp 30 and tracks 52 in the chamber 14.

When the latch hook members 88 and 108 are securely engaged in notches 87, as shown in FIG. 12, the bias of spring 78 pulls carriage push rod 74 toward the rear of the transfer carriage 16 and maintains the push rod 74 in the position shown in FIG. 16.

The loading car 18 can roll into the chamber over tracks 46 and 52. When the leading edge 48 of end 42 of the loading car 18 reaches blocking member 54 of the track lock mechanism, the edge of the car 18 slides along inclined surface 64 of stop portion 56, forcing the stop portion 56 to pivot in a counterclockwise direction about shoulder bolt 60 to permit the loading car 18 to roll over the blocking member 54. When the loading car 18 is fully in the chamber 14, past the blocking member 54, the weight of the weighted portion 58 causes the stop portion 56 to pivot in a clockwise direction, back to its normally upwardly extending blocking position. Then the flat face 62 of stop portion 56 faces the flat complementary squared edge 48 of the loading car 18, blocking the car from travel in the direction of the blocking member 54 and thereby, prohibiting the loading car 18 from leaving the chamber 14. In chambers having openings at both ends as shown in FIG. 2, the loading car 18 is prohibited from traveling in either direction because there are blocking members 54 at each end of the chamber.

At this time, the door 22 can be closed (22b), raising the ramp 30 to its fully raised position (30b) and disengaging the latch hook members 88, 108. A washing or sterilization cycle can be run in any suitable known manner. In other applications, other operations can take place or the car can simply be stored or transported in the chamber 14 or other compartment.

To remove the loading car 18 from chamber 14, the door 22 is opened (26a), causing ramp 30 to be lowered (30a). The latch hook members 88, 108 of the transfer carriage 16 again engage the notches 87 of the ramp 30 as described above. When the transfer carriage 16 is properly aligned with ramp 30 by means of the guide bar 33, and the latch hook members 88, 108 engage the notches 87, the carriage push rod 74 is linearly aligned with ramp push rod 68. To release the track lock mechanism, the knob 76 on transfer carriage 16 is pushed in towards the chamber 14 which is turn pushes carriage push rod 74 and rod tip 75 against the rounded tip 67 of ramp push rod 68, as shown in FIG. 17. The rounded tip 69 of ramp push rod 68 contacts the inclined surface 66 of weighted portion 58 of the blocking member 54, forcing blocking member 54 to pivot in a counterclockwise direction about shoulder boot 60, thereby lowering stop portion 56 and moving the flat face 62 from confronting engagement with the flat facing edge 48 of the loading car 18, as shown in FIG. 8.

When carriage push rod 74 is pushed forward, the conical stop members 80 and 82 move forward with push rod 74 so that conical stop member 80 is moved to the opposite side of bracket member 97 as shown in FIG. 17. When the latch hook members 88, 108 are in engagement with notches 87, the arms 94 of the latch hook members 88 and 108 are substantially horizontal, as in FIGS. 12 and 13. The bracket 97 on latch hook member 88 is below and out of contact with push rod 74 in this position so that forward movement of the conical stop member 80 is not hindered by bracket 97. Arm 104 of the latch release bar 100 slides up the inclined surface of conical stop member 82 until it passes it, then drops down to rest in the area between the stops 82 and 80 and catch behind the flat surface of conical stop 82. The flat side of conical stop member 82 prevents the push rod 74 from moving back, out of contact with push rod 68 so that the track lock blocking member 54 will remain in the unlocked position.

Figure 14:
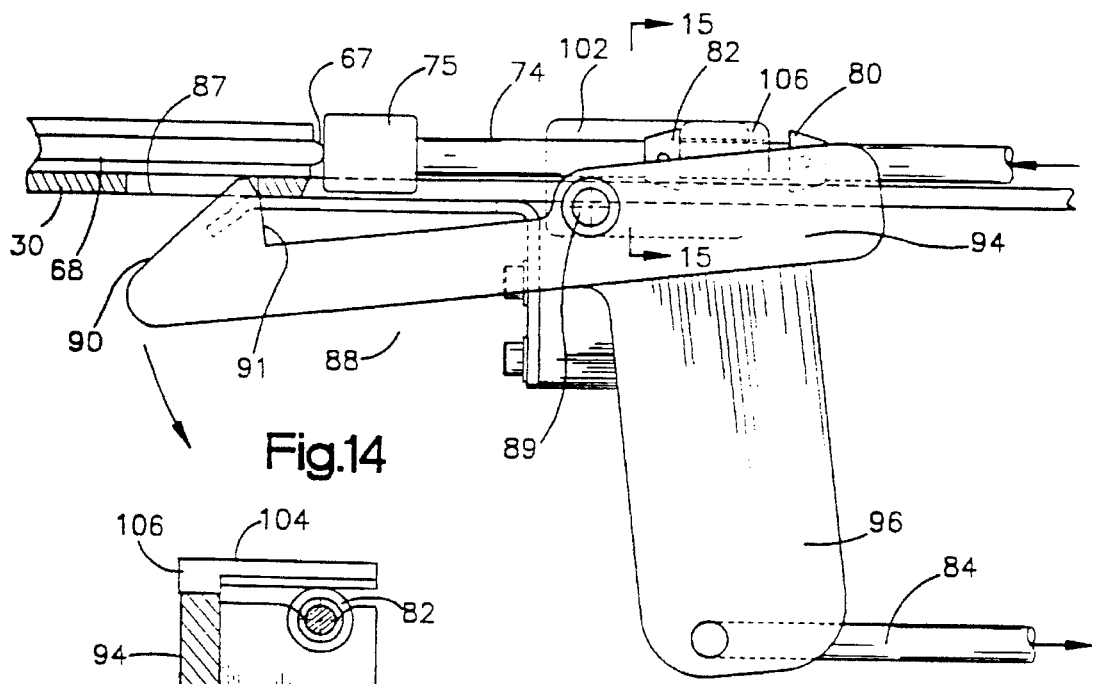
FIG. 14 is a side view of the carriage latch hook showing the operation of the automatic reset feature.
Figure 15:
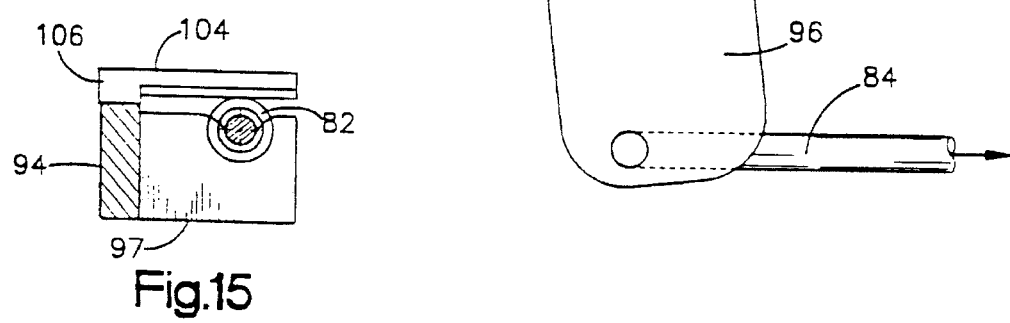
FIG. 15 is a section view of a portion of the fail safe mechanism through line XV—XV of FIG. 14.

The loading car 18 can then safely be pulled out of the chamber 14 onto tracks 46 on transfer carriage 16. Then, the latch hook members 88, 108 can be released from the notches 87 in ramp 30 by pulling knob 86 and latch release rod 84 to tilt leg 96 of latch hook member 108 back, which in turn pivots the arm 94 of latch hook member 108. That pivotal movement is transferred to latch hook member 88 via cross rod 89. Thus, both of the hook portions 90 are pivoted down, out of engagement with notches 87 in ramp 30, as shown in FIG. 14. When the latch hook member 88 is tilted, the rearward section of its arm 94 is lifted upwards causing end 106 of the latch release bar 100 to raise its arm 104 over conical stop member 82, as shown in FIGS. 14 and 15. Spring 78 on push rod 74 pulls push rod 74 back and with it, conical stop member 82 so that the stop member 82 moves to the other side of the latch release bar arm 104. However, the bracket 97 is also raised when the rearward section of arm 94 of latch hook member 88 is tilted up so that bracket 97 is now in contact with push rod 74 and conical stop member 80. The shape of the bracket recess complements the conical shape of the stop member 80 so that the stop member 80 can move rearward through bracket 97, although with some resistance to prevent a rapid snap back. Due to the rearward bias of spring 78, the carriage push rod 74 pulls away from ramp push rod 68 which in turn is pulled away, by the rearward bias of spring 72, from blocking member 54. The blocking member 54 then pivots in the clockwise direction, again raising the stop portion 56 to its blocking position. Thus, the blocking member 54 is automatically reset in the blocking position when the push rods 68, 74 are released.

The mechanism of the present invention provides a fail safe device to prevent unlocking the track lock mechanism if the latch hook members 88, 108 are not securely engaged to the ramp 30. FIG. 10 shows the situation where the hook portions 90 have not engaged the notches 87 of the ramp 30. The latch hook members 88, 108 are tilted upwards so that the bracket 97 on latch hook member 88 is raised to engaged carriage push rod 74 behind conical stop member 80. The stop member 80 blocks carriage push rod 74 from being pushed forward to actuate ramp push rod 68 and to pivot blocking member 54 to the unlocked position. If the operator attempts to push carriage push rod 74 forward, the conical stop member 80 is blocked on three sides by the bracket 97. The shape of the recess in the bracket 97, as shown in FIG. 16, effectively blocks the flat face of conical stop member 80. When moving in the opposite direction, however, the shape of the recess permits the conical side of the stop member 80 to slide through with only moderate resistance. Thus, the track lock mechanism cannot be unlocked if the transfer carriage 16 is not secured to the ramp 30, but when secured, the track lock can be released with ease. The subsequent release of the latch hook members 88, 108 causes the latch release bar 100 to release the stop member 82, permitting automatic reset of the push rod 78 and conical stop members 80, 82.

Figure 13:
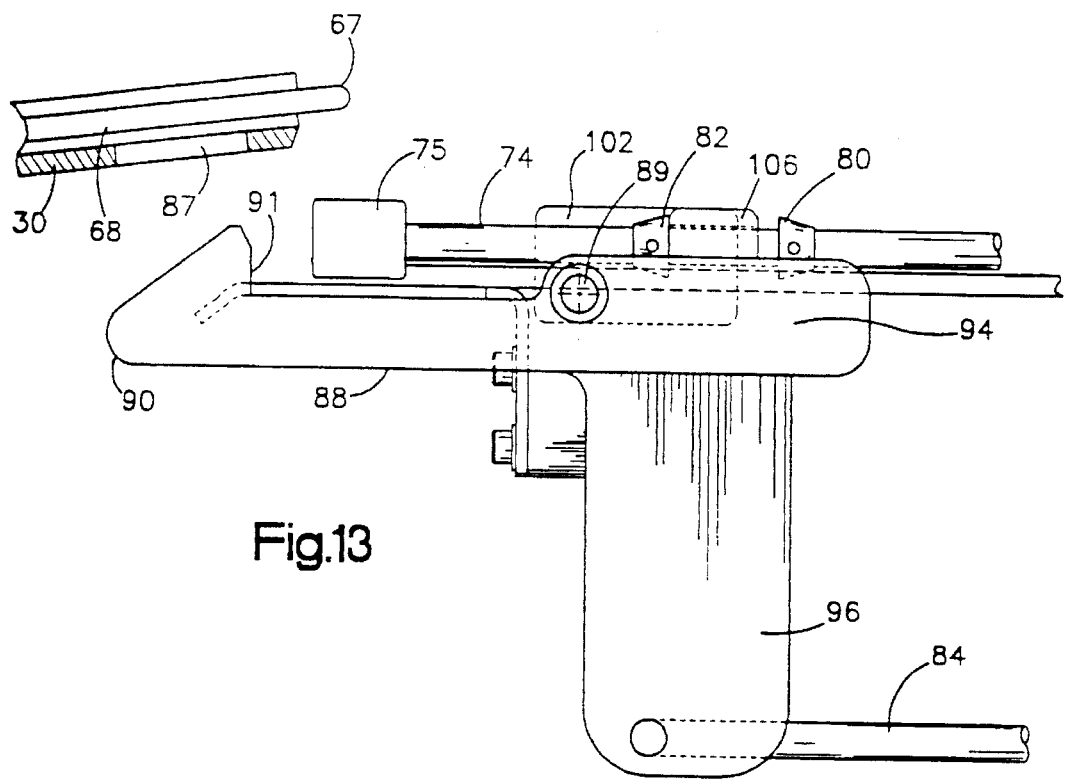
FIG. 13 is a side view of the carriage latch hook of FIG. 11 demonstrating that the door assembly can be moved while the carriage push rod is in a locked position.

If it is necessary to close the door 22 while the transfer carriage 16 is in engagement with ram 30, the door 22 can be closed without releasing the latch hook members 88, 108. The tip 67 of ramp push rod 68 is rounded to permit it to smoothly slide along the surface of rod tip 75, as shown in FIG. 13. When the ramp 30 is raised, push rod 68 automatically pulls away from blocking member 54 due to the action of spring 72. The stop portion 56 is automatically raised to the blocking position. The beveled edge of the inside of hook portion 90 above flat inner face 91 permits the notches 87 to smoothly lift off of hook portion 90 without damage to the ramp 30 or the transfer carriage 16.

To accommodate differences in tolerances in the ramps 30 of different chambers and a variety of different transfer carriages 16, the notches 87 are somewhat larger than the hook portions 90 creating a small gap. The rod tip 75 is threaded onto push rod 74 to permit linear adjustment to make sure that proper contact between the rod tip 75 and the tip 67 of ramp push rod 68 and adequate clearance for movement of the ramp 30 occurs, notwithstanding the permissible gap in the engagement of the hook portions 90 to notches 87. The V-shaped ends 49 on tracks 46 and the complementary recesses 45 on ramp 30 also permit some deviation in the dimensions of the complementary surfaces in a variety of different components intended to function together.

Another preferred embodiment of the invention, described in FIGS. 18–23, comprises a transfer platform 110 that is sealed inside of an airtight workstation 112. The airtight workstation 112 provides a controlled atmosphere that is sealed from the environment outside of it. The atmosphere in the workstation 112 may be any type of atmosphere that is desirable to separate from the general environment such as a sterilized atmosphere, or one that consists of toxic gases. A workstation consists of an airtight compartment that is formed by four walls, a ceiling and a floor that are usually comprised of known, transparent plastic materials. One wall or the floor of the workstation 112 is formed into a worksuit 114 to accommodate the hands, head and shoulders of an operator so that the operator can manipulate items in the controlled environment contained in the workstation 112. Examples of known sealed workstations are set forth in Amsco publication Nos. SD-446 and SD-448, both dated 1990.

Figure 18:
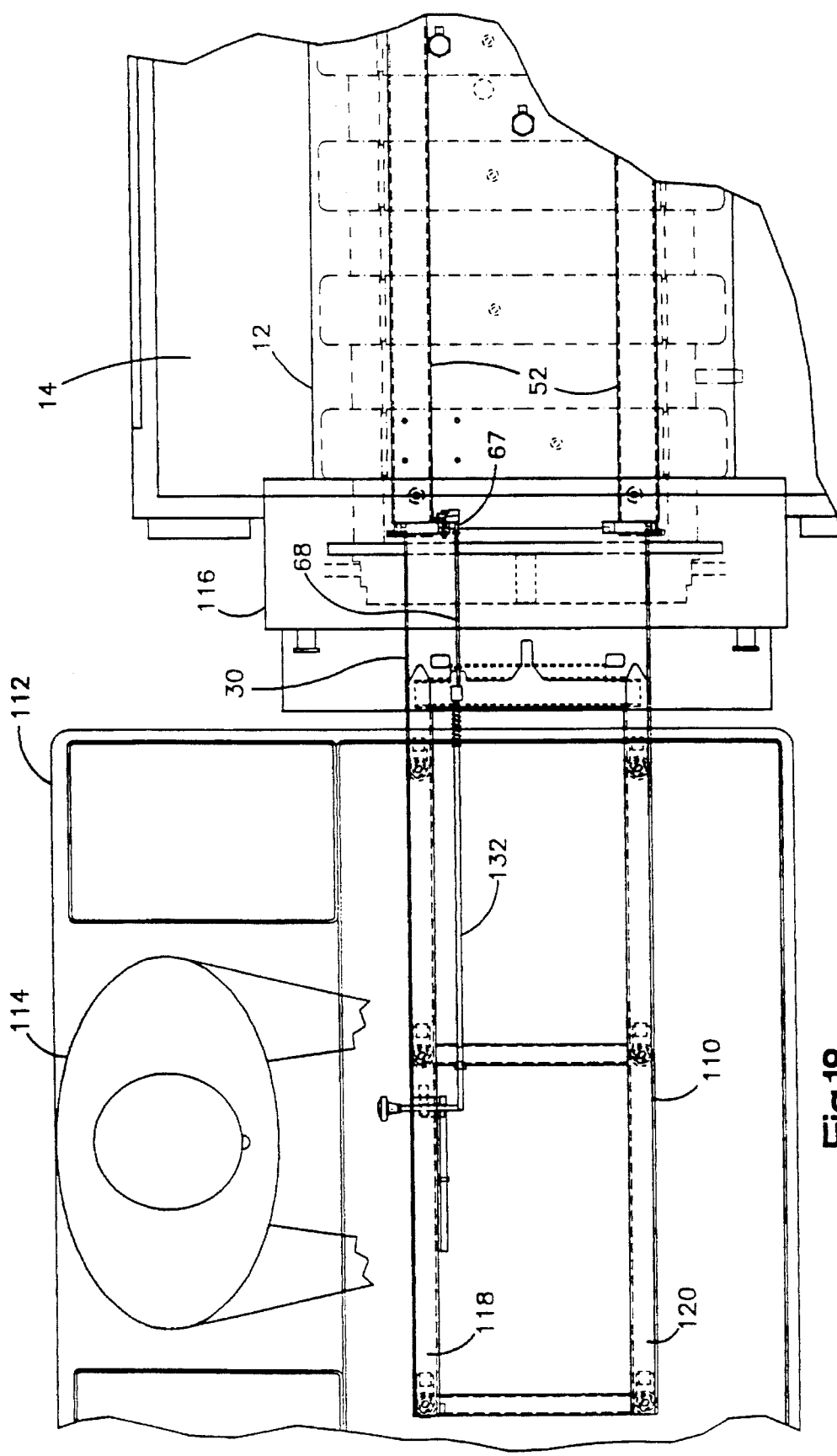
FIG. 18 is the top view of an airtight workstation that contains a transfer platform with a release and an automatic reset mechanism, an adaptor box attached to the workstation and the chamber of a sterilizer/washer attached to the adaptor box.

Referring to FIG. 18, the workstation 112 is attached to one end of an airtight, adaptor box 116, which is a hollow steel duct. The other end of adaptor box 116 is then attached to the chamber housing 12. In this embodiment, the loading car 18 may move out of the chamber 14 on tracks 52, across ramp 30, through the adaptor box 116 and onto the transfer platform 110 contained in the workstation 112. With the loading car 18 in workstation 112, a user may manipulate items on the loading car 18 while the controlled environment in the workstation 112 is maintained. For example, if chamber 14 is a sterilizer, the environment in the workstation 112 could also be sterile. In this embodiment, after a sterilization cycle, a user could manipulate the sterilized items in the loading car 18 that is in the sterile atmosphere of the workstation 112, and these items would still remain sterile after manipulation.

Referring now to FIGS. 19 and 20, the transfer carriage 110 has two (2) tracks, 118 and 120. Each track 118, 120 is mounted on three (3) legs. Track 118 is mounted on legs 122, 124 and 126. Legs 122, 124 and 126 are fixed to the bottom of the workstation 112 by fastening means not shown. Tracks 118 and 120 have two (2) V-shaped tips, 128 and 130 that fit into the recesses on ramp 30 when it folds down.

Transfer platform 110 also has a push rod 132 that is attached by brackets 134 and 136 to cross-members 138 and 140, respectively. Push rod 132 passes through brackets 134 and 136 and moves laterally within them. Push rod 132 has an adjustable rod tip 142 that is identical in structure and function to rod tip 75. Rod 132 also passes through a spring 144 that is provided adjacent to bracket 136.

Figure 23:
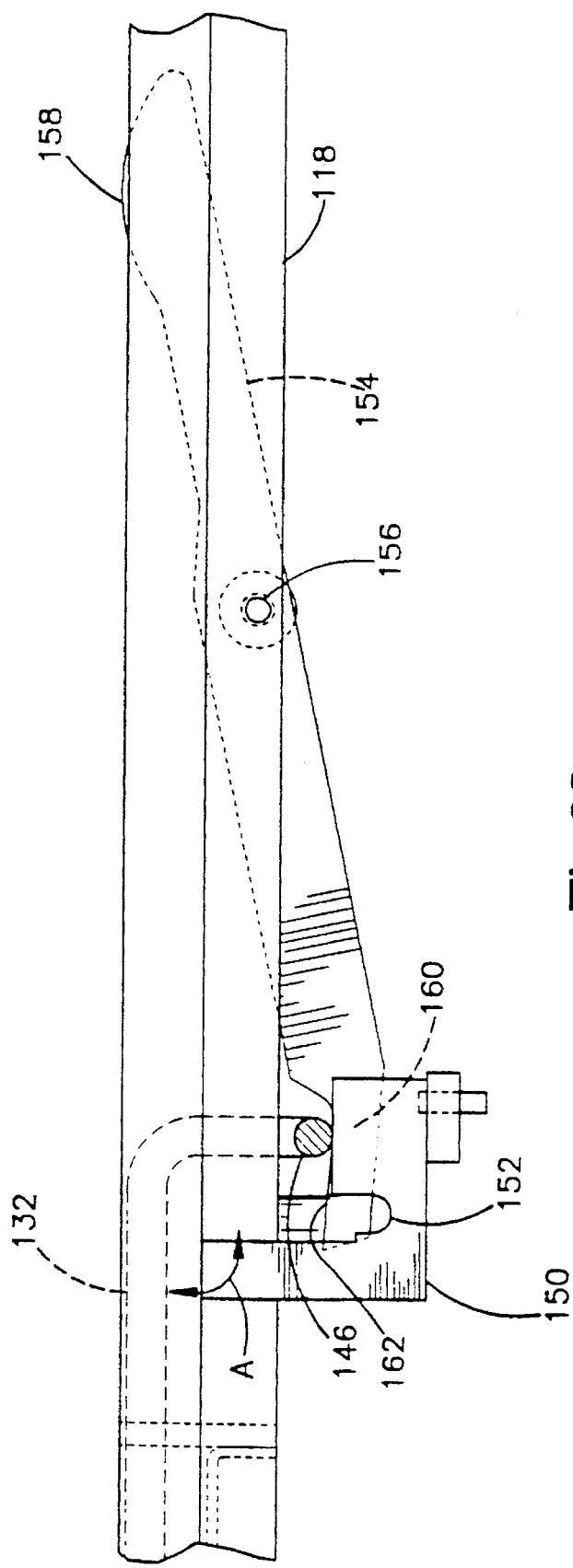
FIG. 23 is a side view of the release and automatic reset mechanism of FIG. 19 with the push rod in the reset position.

Referring to FIGS. 21–23, push rod 132 has a first 90° radius, A, and a second 90° radius, B. Radius A and radius B are approximately 2 inches apart. A threaded end 146 of push rod 132 is provided and a knob 148 is screwed on to end 146.

Between end 146 and radius B, push rod 132 passes through and rests on an L-shaped bracket 150 that is attached to track 118. Bracket 150 has a recess 152 in which push rod 132 may be placed. Between radius B and end 146, push rod 132 is perpendicular to track 118, and knob 148 is mounted on the side of transfer platform 110 accessible to a user through work suit 114.

A movable member 154 is provided that is pivotally mounted to the inside of track 118 by a known shoulder bolt 156 that is the pivot point for member 154. Member 154 has a rounded end 158 and an end 160 that has a horizontally flat surface 162. Movable member 154 is weighted such that in its normal position, rounded end 158 is positioned slightly above track 118 and end 160 is directly beneath the section of rod 132 that is perpendicular to track 118. Recess 152 and lever arm 154 comprise a detent mechanism as explained below.

To remove the loading car 18 from chamber 14, once again door 22 is opened, causing ramp 30 to be lowered. The V-shaped recesses 45 of ramp 30 engage with the V-shaped ends 128 and 130 of tracks 118 and 120 to properly align the transfer platform 110 with ramp 30. Referring to FIG. 18, when properly aligned, push rod 132 is linearly aligned with ramp push rod 68.

Referring to FIG. 22, to release the track lock mechanism remotely from the workstation 112, knob 148 is used to move end 146 of push rod 132 into recess 152 which compresses spring 144 against bracket 136. FIGS. 22 and 23 show end 146 without knob 148 for purposes of illustration. This movement into recess 152 pushes push rod 132 and tip 142 against the rounded tip 67 of ramp push rod 68 shown in FIG. 2. This causes rounded tip 69 of ramp push rod 68 to contact the blocking member 54 which activates it to the unlocked position as more fully described above and depicted in FIGS. 6–9. Recess 152 prevents tip 142 of push rod 132 from moving back, out of contact with push rod 68 so that track lock blocking member 54 will remain in the unlocked position.

The loading car 18 can then safely be pulled out of chamber 14 onto tracks 118 and 120 of the transfer platform 110 where items within it are easily accessible from work suit 114.

When loading car 18 rolls onto tracks 118 and 120 far enough so that its back end 42 has gone past blocking member 54, the leading edge 48 of front end 42 contacts the rounded end 158 of lever 154. This causes lever 154 to rotate clockwise on bolt 156 which in turn causes surface 162 to contact end 146 of push rod 132 and move rod 132 out of slot 152. When rod 132 moves out of slot 152, spring 144 pushes rod 132 out of contact with ramp push rod 68 which disengages blocking device 54 from an open position back to its normally closed position. The disengaged position of rod 132 is depicted in FIG. 23. Thus, when a loading car is rolled out from chamber 14 into workstation 112 onto tracks 118 and 120, the blocking member 54 automatically resets to a closed position without any intervention by the user in the workstation 112.

This embodiment may also include a known means for locking the loading car 18 in a stationary position on transfer platform 110 for safety purposes, such as a lever arm 164. In addition, although this embodiment specifically discloses a recess 152 and lever 154 as the means for holding and then releasing push rod 132, these devices may be replaced by other detent mechanisms.

Finally, although the track lock mechanism has been described as being weighted to automatically assume the blocking position and the track lock release mechanism has been described for use in moving the track lock from the blocking position to a position which permits travel of the loading car 18, one skilled in the art can see that the broad application of the mechanism of the present invention can be easily revered by altering the shape of the blocking member 54 to have the track lock weighted or otherwise biased to automatically assume a position which permits travel. Actuation of the push rods 68 and 74 would then move the track lock to the blocking position. In the preferred application, however, for safety precautions, the track lock should be weighted to automatically assume the blocking position.

What we claim is:

1. Apparatus for use with a movable transfer carriage and a stationary surface of a chamber for remotely permitting or prohibiting the travel of a movable loading car from the stationary surface to the movable transfer carriage comprising:

a blocking member mounted on the stationary surface for rotational movement between a first position in which the travel of the loading car is blocked and a second position in which the loading car is permitted to travel;

an actuating member secured to said transfer carriage for linear reciprocating movement, thereby contacting said blocking member, in order to move it from said first position to said second position;

a securing member for releasably securing the movable transfer carriage to the stationary surface;

first stop member mounted on the actuating member and cooperating with the securing member for preventing said actuating member from moving said blocking member from said first position to said second position unless said securing member secures the movable transfer carriage to the stationary surface; and second stop member mounted on the actuating member and cooperating with the securing member for maintaining said actuating member in operative contact with said blocking member to maintain said blocking member in said second position.

2. The apparatus of claim 1 wherein the first and second positions of said actuating member are respective locked and unlocked positions, said apparatus further comprising:

a detent for holding said actuating member into operative contact with said blocking member to maintain said blocking member in either a locked or unlocked position and for releasing said actuating member to permit said actuating member to move out of operative contact with said blocking member to reverse said blocking member to the other of said locked or unlocked positions.

3. The apparatus recited in claim 2 wherein said detent is released automatically by the travel of said loading car.

4. The apparatus recited in claim 2 wherein said detent comprises:

a horizontal member with a recess in which said actuating member is held to maintain said blocking member in said locked or unlocked positions; and a rotating member on a pivot that moves said actuating means out of the recess to release said actuating member.

5. The apparatus of claim 1 wherein the securing member further secures a first surface into position relative to an adjacent second surface at least a portion of which lies in a same plane as said first surface, wherein the first surface is on said movable transfer carriage and the second surface is said stationary surface, wherein said securing member further comprises:

a pivoting member having a forward section for releasable engagement with a complementary engagement section on the second surface and a rearward section, said pivoting member being pivotally mounted on the first surface at a pivotal center intermediate said forward section and said rearward section such that said pivoting member can pivot in a first direction to effectuate engagement and can pivot in a second direction to effectuate disengagement with said complementary engagement section.

6. The apparatus recited in claim 5 wherein said forward section has an operative part comprising a generally hook shaped member having a smooth outer contour and a blunt inner contour for engaging contact with said complementary section.

7. The apparatus recited in claims 6 wherein there are two said members operatively connected to each other through the pivotal centers of each said member and one said member further comprises a leg section extending from said rearward section of said one member;

moving means pivotally connected to said leg section for moving said one member in said second direction such that said movement of said one member moves the other said member.

8. The apparatus recited in claim 7 wherein said moving means is an elongate rod slidably mounted on the first surface and having a handle remotely situated from the second surface proximate a rear of the first surface.

9. The apparatus recited in claim 5 further comprising means for biasing said pivoting member in said first direction.

10. The apparatus recited in claim 1 wherein said actuating member is mounted on the movable transfer carriage.

11. The apparatus recited in claim 1 wherein said actuating member is mounted on a portion of the stationary surface.

12. The apparatus recited in claim 11 wherein said portion of the stationary section is a ramp pivotally attached to an edge of the stationary surface facing the movable transfer carriage.

13. The apparatus recited in claim 1 further comprising a bridge member intermediate the movable transfer carriage and the stationary section and wherein said actuating member is mounted on said bridge member.

14. The apparatus recited in claim 13 further comprising means mounted on the movable transfer carriage remotely situated from said blocking member for moving said actuating member into operative contact with said blocking member to effectuate movement thereof to said second position.

15. The apparatus recited in claim 1 wherein said actuating member is a first rod having a first end proximate said blocking member and a second end remotely situated from said blocking member;

said blocking member is pivotally mounted at a pivot point on the stationary surface in a path of travel of the moveable loading car and includes a first portion on one side of said pivot point and a second portion on the other side of said pivot point, said first portion being configured for blocking contact with the movable loading car when the movable loading car is on the path and said second portion being configured for operative contact with said first end of said actuating member;

means for biasing said first end of said first rod away from operative contact with said blocking member;

a cooperating member slidably mounted on the movable transfer carriage for movement toward, and operative contact with, said second end of said first rod to move said first end of said first rod into operative contact with said blocking member to effectuate movement of said blocking member to said second position.

16. The apparatus recited in claim 15 wherein said cooperating member comprises a second rod having a longitudinal axis and being slidably mounted for movement in a direction of said longitudinal axis, said second rod having a blunt surface at one end thereof for contact with said second end of said first rod when said second rod is moved into linear alignment with said first rod and moved into contact with said second end of said first rod.

\* \* \* \* \*